United States Patent
Kraemer et al.

(10) Patent No.: US 10,900,198 B2
(45) Date of Patent: Jan. 26, 2021

(54) CLUTCH FOR A CONSTRUCTION MACHINE

(71) Applicant: Wirtgen GmbH, Windhagen (DE)

(72) Inventors: Philipp Kraemer, Linz (DE); Winfried Von Schoenebeck, Kalenborn (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 0 days.

(21) Appl. No.: 16/106,465

(22) Filed: Aug. 21, 2018

(65) Prior Publication Data
US 2019/0063038 A1    Feb. 28, 2019

(30) Foreign Application Priority Data

Aug. 25, 2017   (DE) .................. 10 2017 214 939

(51) Int. Cl.
| | |
|---|---|
| *E02F 9/20* | (2006.01) |
| *F16D 25/12* | (2006.01) |
| *F16D 13/74* | (2006.01) |
| *F16D 25/0638* | (2006.01) |
| *F16D 25/063* | (2006.01) |
| *F16D 48/02* | (2006.01) |

(52) U.S. Cl.
CPC .............. *E02F 9/202* (2013.01); *F16D 13/74* (2013.01); *F16D 25/063* (2013.01); *F16D 25/0638* (2013.01); *F16D 25/123* (2013.01); *F16D 25/14* (2013.01); *F16D 2500/1112* (2013.01)

(58) Field of Classification Search
None
See application file for complete search history.

(56) References Cited

U.S. PATENT DOCUMENTS

| | | | | |
|---|---|---|---|---|
| 2,838,913 | A | * | 6/1958 | Peterson ................ B64D 35/00 60/709 |
| 2,924,983 | A | * | 2/1960 | Curran ................... F16D 21/06 74/330 |
| 3,265,175 | A | | 8/1966 | Croswhite |

(Continued)

FOREIGN PATENT DOCUMENTS

| | | |
|---|---|---|
| DE | 1555340 A1 | 2/1971 |
| DE | 19642305 A1 | 4/1998 |

(Continued)

OTHER PUBLICATIONS

European Search Report and Written Opinion in corresponding European Patent Application EP 18187464, dated Oct. 16, 2018, 8 pages (not prior art).

(Continued)

*Primary Examiner* — Timothy Hannon
(74) *Attorney, Agent, or Firm* — Lucian Wayne Beavers; Patterson Intellectual Property Law, PC (57) ABSTRACT

In a clutch (14) for a construction machine (1), comprising a drive-side end (58) and a driven-side end (60), a driven shaft (22), wherein, at the drive-side end (58), a drive-side bearing (40) is arranged at the driven shaft (22), it is specified for the following features to be achieved: that a lubricant line (42) for lubrication of the drive-side bearing (40) is specified which leads from the driven-side end (60) to the drive-side bearing (40) and extends, at least sectionally, through the driven shaft (22).

13 Claims, 10 Drawing Sheets

(56) References Cited

U.S. PATENT DOCUMENTS

| | | | | |
|---|---|---|---|---|
| 3,463,283 | A | * | 8/1969 | Stow .................... F16D 25/123 192/85.61 |
| 3,823,802 | A | | 7/1974 | Winzeler et al. |
| 3,833,100 | A | * | 9/1974 | Aschauer ............ F16D 25/0638 192/85.27 |
| 4,899,861 | A | * | 2/1990 | Cummings, III ....... F01P 7/046 192/110 B |
| 4,947,974 | A | | 8/1990 | Smemo et al. |
| 5,009,118 | A | | 4/1991 | Raszkowski et al. |
| 5,495,927 | A | | 3/1996 | Samie et al. |
| 5,535,850 | A | * | 7/1996 | Tar ....................... B60K 17/046 184/27.1 |
| 5,577,588 | A | * | 11/1996 | Raszkowski ............ F16D 13/74 192/113.35 |
| 6,142,280 | A | * | 11/2000 | Koike ................ F16D 25/0638 192/113.34 |
| 6,701,241 | B2 | * | 3/2004 | Senger .................... F16D 48/06 342/379 |
| 9,732,807 | B1 | | 8/2017 | Logan et al. |
| 2008/0121488 | A1 | * | 5/2008 | Miyazaki ............ F16D 25/0638 192/70.12 |
| 2009/0020388 | A1 | * | 1/2009 | Mahlberg ................ F16D 13/52 192/30 V |
| 2010/0108166 | A1 | * | 5/2010 | Anderson ............. F16L 27/087 137/803 |
| 2012/0181135 | A1 | * | 7/2012 | Raszkowski .......... F16D 25/061 192/69.8 |
| 2013/0228411 | A1 | * | 9/2013 | Wesley ................ F16D 25/123 192/85.61 |

FOREIGN PATENT DOCUMENTS

| | | |
|---|---|---|
| EP | 0324152 A1 | 7/1989 |
| EP | 2719912 A2 | 4/2014 |
| FR | 1196177 A | 11/1959 |

OTHER PUBLICATIONS

European Examination Report of corresponding EP 18 187 464.5, dated Apr. 29, 2020, 4 pages (not prior art).
Search Report of corresponding China patent application No. 2018109630334, dated Aug. 11, 2020, 3 pages (not prior art).

* cited by examiner

CLUTCH FOR A CONSTRUCTION MACHINE

BACKGROUND OF THE INVENTION

1. Field of the Invention

The invention relates to a clutch for a construction machine, as well as to a construction machine with clutch.

2. Description of the Prior Art

Clutches for construction machines are known which are arranged in the drive train of a construction machine. In this arrangement, the clutch is preferably arranged in the drive train between the drive engine and a working device, preferably a working drum in the construction machine. The clutch comprises a drive-side end and a driven-side end. Furthermore, the clutch comprises a driven shaft, wherein a drive-side bearing is arranged at the drive-side end of the driven shaft.

Said drive-side bearing is typically lubricated once prior to being installed in the construction machine. At the drive-side end, the clutch is frequently directly connected to other modules of the drive train. Due to the position at the drive-side end, it is therefore only possible with considerable effort, in the installed state, to reach said bearing and to perform further lubrications. This may lead to premature wear and tear.

SUMMARY OF THE INVENTION

It is therefore the object of the invention to simplify maintenance of the clutch and to extend the service life of the elements of a clutch for a construction machine.

The invention advantageously specifies that a lubricant line for lubrication of the drive-side bearing is specified which leads from the driven-side end to the drive-side bearing and extends, at least sectionally, through the driven shaft.

This offers the advantage that the drive-side bearing can also be lubricated from the driven-side end. It is particularly advantageous that no or merely a few parts of the clutch or other elements of the drive train must be previously removed. The bearing can therefore be lubricated at regular intervals. This can significantly extend the service life of said bearing.

Sectionally means that the lubricant line extends at least partially through the driven shaft.

The lubricant line may extend, at least sectionally, concentrically inside the driven shaft. It may be specifically specified in this arrangement that the section of the lubricant line extending inside the driven shaft extends concentrically inside the driven shaft.

Alternatively, the lubricant line may extend, at least sectionally, eccentrically inside the driven shaft.

The clutch may be a hydraulic clutch, with a hydraulic line for switching the clutch extending, at least partially, inside the driven shaft.

The hydraulic line may extend, at least sectionally, concentrically inside the driven shaft. It may be specifically specified in this arrangement that the section of the hydraulic line extending inside the driven shaft extends concentrically inside the driven shaft.

The lubricant line may extend, at least partially, inside the hydraulic line.

The lubricant line may extend, at least sectionally, concentrically to the hydraulic line.

The lubricant line may extend through the entire driven shaft.

The lubricant line may comprise a first section which is arranged inside a rod-shaped device which in turn extends inside the hydraulic line.

The rod-shaped device may feature additional openings for the hydraulic fluid.

The driven-side end of the lubricant line may be closed by means of a cover element, wherein the cover element, in the maintenance state, may be removable from the clutch, for example, for performing maintenance work, and thus the lubricant line may be connected to a lubricant supply. The clutch is preferably not in operation when in the maintenance state.

The cover element may be designed as a rotary feed-through and feature an opening for the hydraulic line so that, in the operating state of the clutch, the hydraulic line is connected to a hydraulic supply by means of the cover element.

The driven-side end of the lubricant line may alternatively be closed by means of a dual rotary feed-through, wherein the dual rotary feed-through comprises, as a minimum, one opening to the lubricant line and, as a minimum, one opening to the hydraulic line.

Lubrication can then be effected automatically, for example, by means of a central lubrication system preferably in accordance with a predetermined time schedule.

A construction machine with clutch may furthermore be specified in accordance with one of the claims.

BRIEF DESCRIPTION OF THE DRAWINGS

Hereinafter, embodiments of the invention are illustrated in more detail with reference to the drawings.

The following is shown schematically:

FIG. 8 an alternative clutch with dual rotary feed-through,

DETAILED DESCRIPTION

Figure 1:
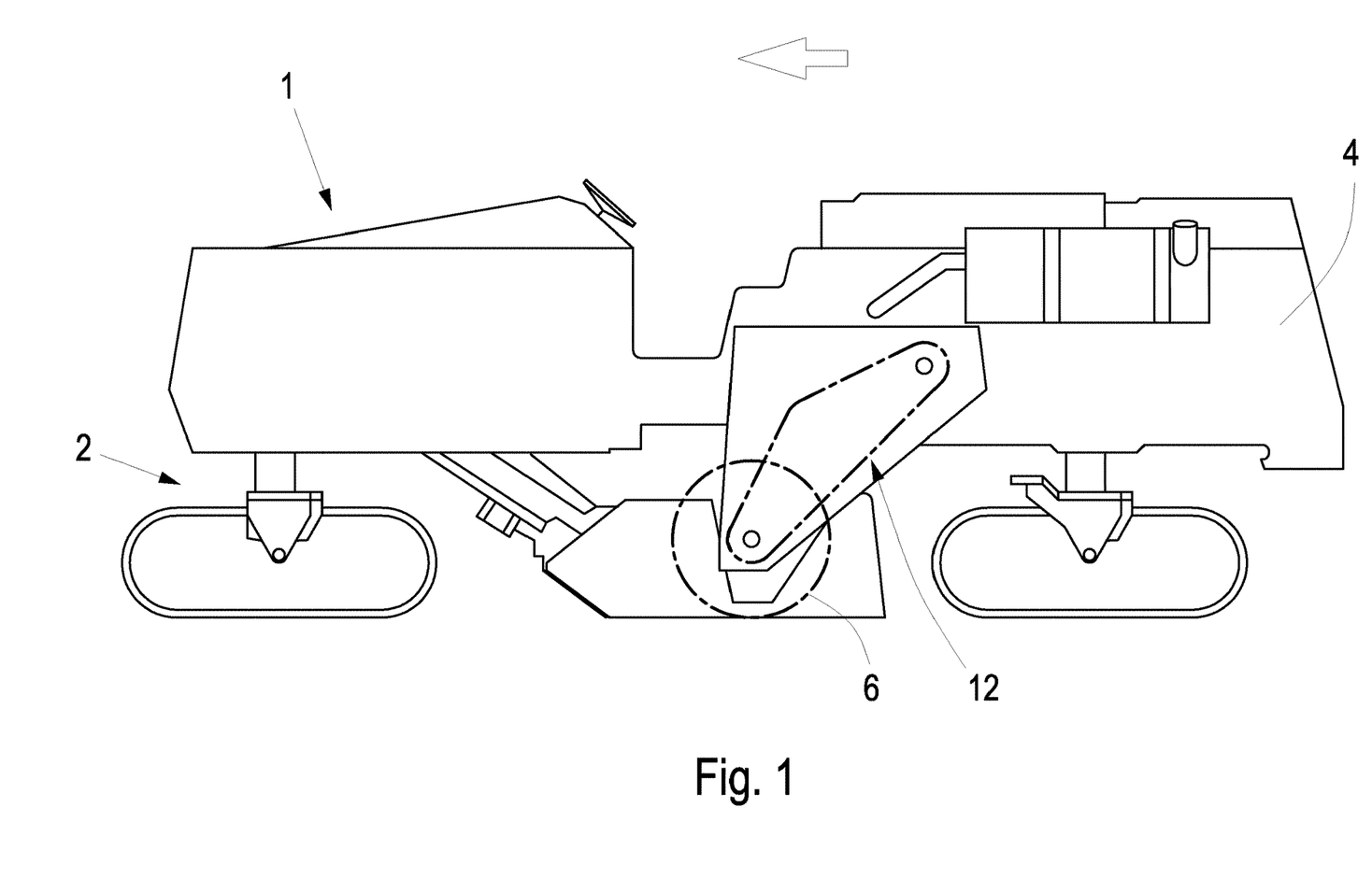
FIG. 1 a construction machine.

FIG. 1 shows a construction machine 1 in the design of a large milling machine. The construction machine 1 may, however, also be any other type of construction machine comprising a drive train in which a clutch is arranged. The depicted construction machine 1 comprises ground-engaging units 2 which support a machine frame 4. A working drum 6 is mounted at the machine frame 4 as a working device for working a ground pavement 3. To work the ground pavement 3, the working drum 6 may comprise non-depicted milling tools at the shell surface of the working drum 6.

The machine frame 4 may be adjustable in height via the ground-engaging units 2. The ground-engaging units may be wheels or tracked ground-engaging units. The construction machine 1 may furthermore comprise a non-depicted conveying device for transporting away the milling material.

The drive train 8 drives the working drum 6. The drive train 8 comprises, as a minimum, a clutch 14.

The construction machine 1 may be a milling machine, in particular, a road milling machine, a recycler or stabilizer, or a surface miner.

Figure 2:
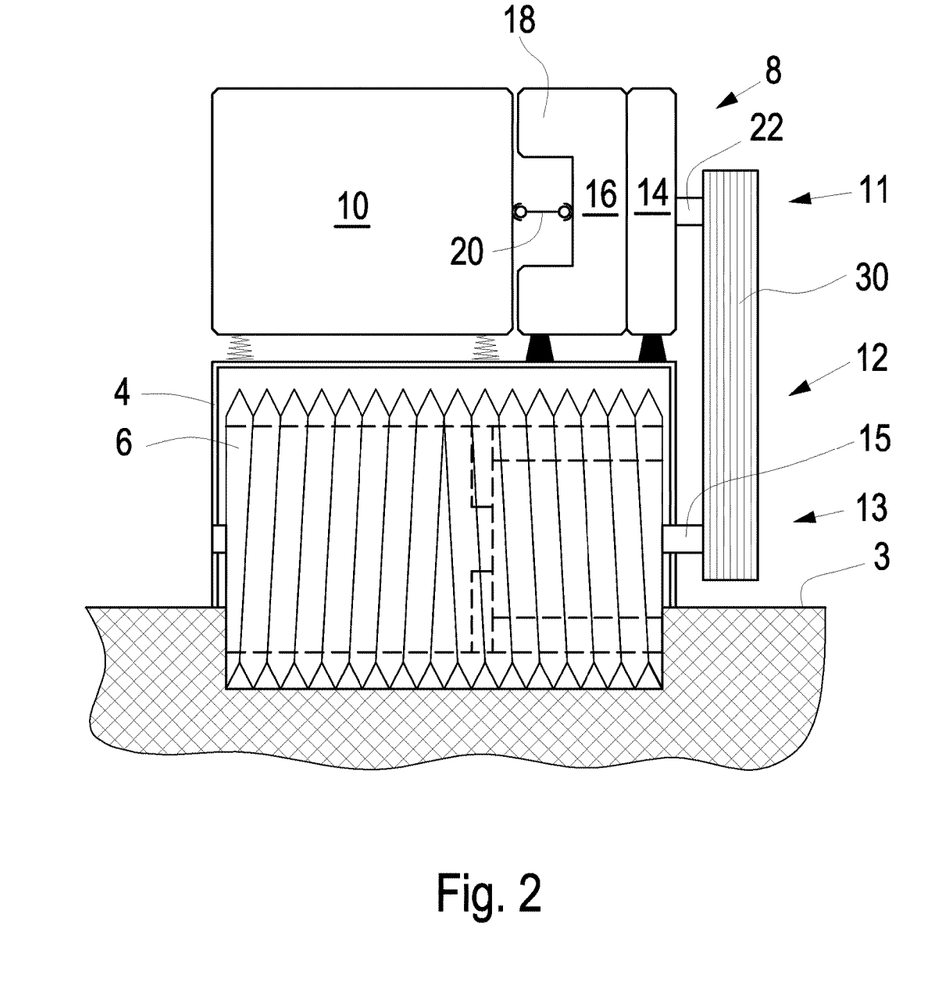
FIG. 2 a drive train of the construction machine.

FIG. 2 shows a schematic cross-section of a construction machine 1 comprising a working drum 6 which is mounted in a machine frame 4. Alternatively, the working drum 6 may be mounted in a drum housing which is in turn rigidly attached to the machine frame 4. The working drum 6 may also be mounted in a movable, especially height-adjustable, fashion relative to the machine frame 4. The working drum 6 may consist of, for example, a milling drum.

The drive train 8 is depicted in FIG. 2. The drive unit 10 is depicted in FIG. 2. Said drive unit 10 may preferably comprise a combustion engine. Said combustion engine may specifically be a diesel engine. The drive unit 10 may be coupled, via an articulated coupling device such as an elastomer coupling 20, to a pump transfer gearbox 16 for driving hydraulic modules, for example, hydraulic pumps 18. The elastomer coupling 20 may also be arranged at a different point in the drive train 8.

The drive train 8 furthermore comprises a clutch 14 which is arranged in the drive train 8 between the drive unit 10 and the working drum 6. Said clutch 14 is a device for switching the torque.

A traction mechanism 12 for the mechanical drive of the working drum 6 is arranged between the clutch 14 and the working drum 6. The traction mechanism 12 comprises a drive element 11 which is coupled, in a torsionally rigid fashion, to a driven shaft 22 of the clutch 14. The traction mechanism 12 furthermore comprises a driven element 13 which is coupled, in a torsionally rigid fashion, to a drive shaft 15 of the working drum 6. A gearbox, specifically, a planetary gearbox, may additionally be arranged between the drive shaft 15 and the working drum 6.

The traction mechanism 12 is preferably a belt drive, wherein the drive elements and driven elements consist of belt pulleys 11, 13, with at least one drive belt 30 revolving over said belt pulleys 11, 13. Alternatively, the traction mechanism 12 may, for example, consist of a chain drive, wherein the drive elements and driven elements then consist of sprockets.

The drive unit 10 or the pump transfer gearbox 16, respectively, may be coupled to the belt pulley 11 via the clutch 14.

Figure 3:
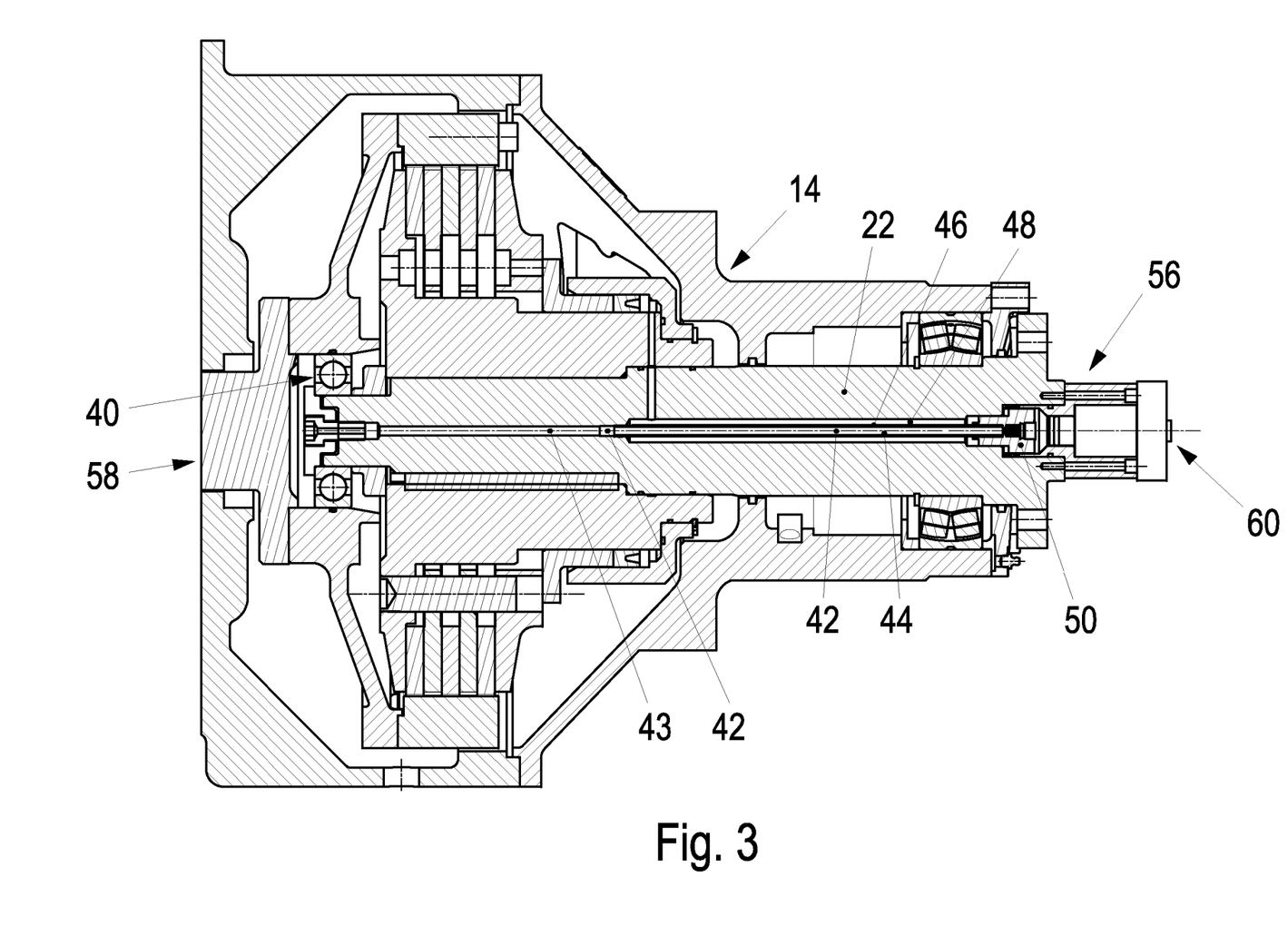
FIG. 3 a clutch of the drive train.

The clutch 14 is depicted in greater detail in FIG. 3. The clutch 14 is preferably a hydraulic clutch. The clutch 14 comprises a drive-side end 58 and a driven-side end 60. A driven shaft 22 is furthermore specified, wherein a drive-side bearing 40 for the driven shaft 22 is arranged at the drive-side end.

A lubricant line 42 for lubrication of the drive-side bearing 40 is specified, which leads from the driven-side end 60 to the drive-side bearing 40 and extends, at least sectionally, through the driven shaft 22.

As depicted, the lubricant line extends concentrically inside the driven shaft 22. Alternatively, the lubricant line 42 could, however, also extend eccentrically to the driven shaft 22.

The depicted hydraulic clutch 14 furthermore comprises a hydraulic line 48 for switching the clutch 14. Said hydraulic line 48 extends, at least partially, inside the driven shaft 22. In this design, the hydraulic line 48 extends, in particular, concentrically inside the driven shaft 22. The lubricant line 42 extends, at least partially, inside the hydraulic line 48. In this case, the first section 46 of the lubricant line 42 extends inside the hydraulic line 48. A rod-shaped device 44 is specified for this purpose, which extends inside the hydraulic line 48 and inside of which the first section 46 of the lubricant line 42 is arranged.

The driven-side end 60 of the lubricant line 42 is closed by means of a cover element 56. The cover element 56 is removable in a maintenance state so that, in this case, the lubricant line 42 can be connected to a lubricant supply.

In the embodiment depicted in FIG. 3, the cover element 56 is designed as a rotary feed-through, wherein the same comprises an opening for hydraulic fluid for the hydraulic line 48.

In an operating state, in which the cover element 56 closes the lubricant line 42, the hydraulic line 48 can then be connected to a hydraulic supply by means of the cover element.

Figure 4:
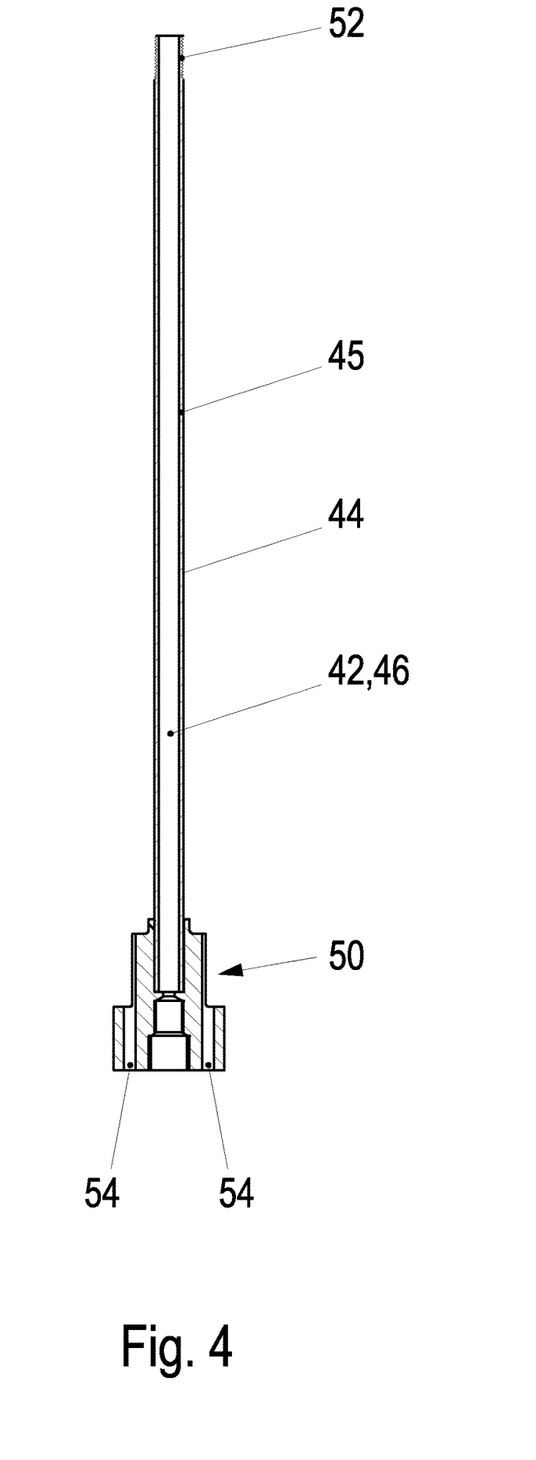
FIG. 4 a rod-shaped element of the clutch according to the invention.

The rod-shaped device 44 is depicted in greater detail in FIG. 4. The same comprises a head section 50 which is arranged at one end of the rod-shaped device 44. The head section 50 is followed by a rod-shaped element 45. The lubricant line 42, or the first section 46 of the lubricant line, respectively, extends through the rod-shaped element 45 and the head section 50. The head section 50 furthermore comprises additional openings 54 for the hydraulic fluid. A thread 52 is arranged at the end opposite the head section which can be screwed into the second section 43 of the lubricant line 42.

Figure 5:
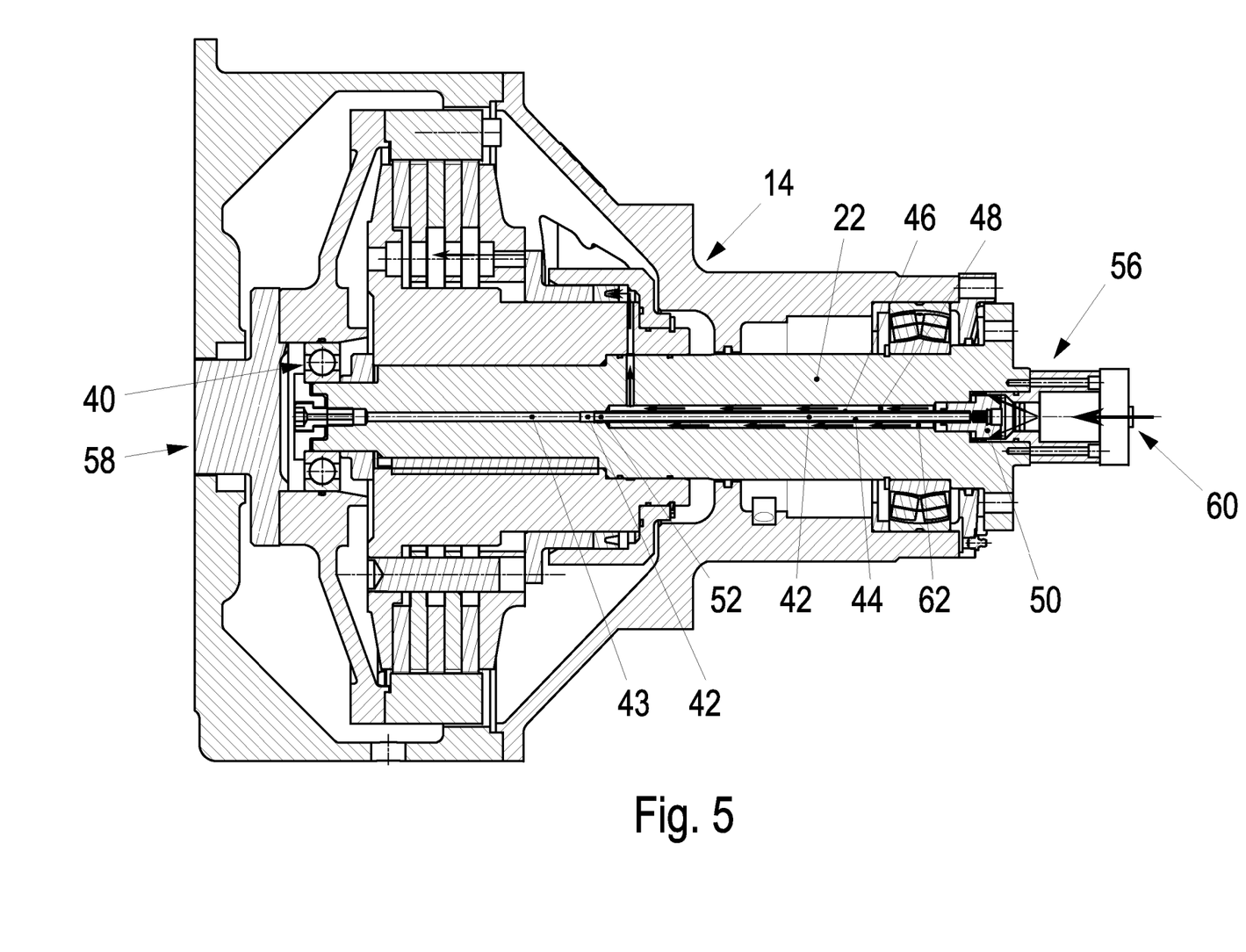
FIG. 5 the clutch according to FIG. 3 in the operating state.

FIG. 5 shows the clutch 14 in the operating state. In the process, through the cover element 56 which, in the embodiment depicted, is a rotary feed-through, hydraulic fluid is conducted, during operation, through the rotary feed-through and through the head section 50 of the rod-shaped device 44 into the hydraulic line 48. The hydraulic clutch 14 can be switched by means of the hydraulic fluid. The direction of flow of the hydraulic fluid is indicated by means of the arrows 62. At the transition between the first section 46 of the lubricant line 42 and the second section 43 of the lubricant line 42, the hydraulic line 48 is closed by means of the rod-shaped device 44 which, at this end, is screwed into the second section 43 with the thread 52. The hydraulic line 48 and the lubricant line 42 are separated from one another so that no hydraulic fluid can enter the lubricant line 42, and no lubricant can enter the hydraulic line 48.

Figure 6:
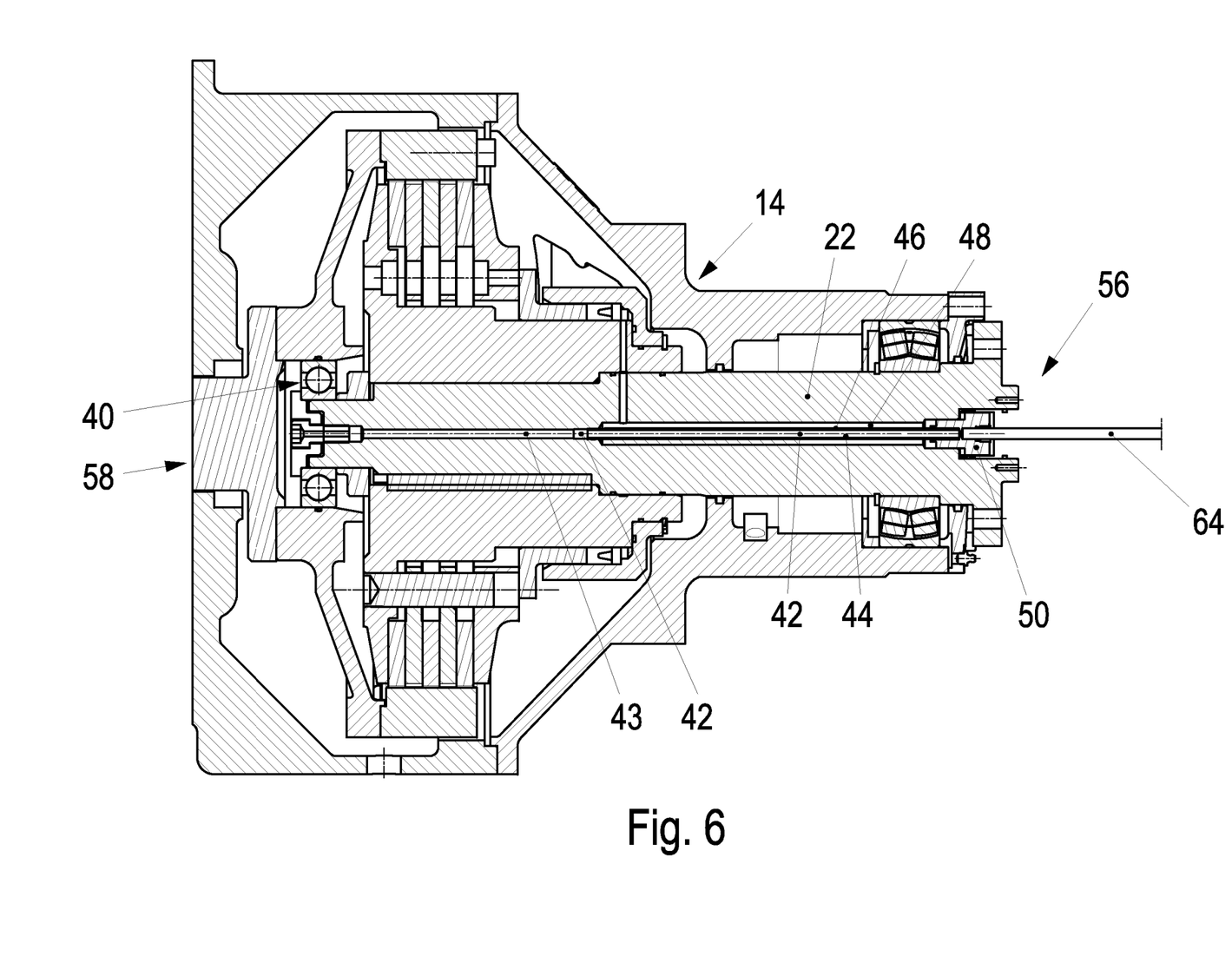
FIG. 6 the clutch according to FIG. 3 in a maintenance state.

A maintenance state of the clutch 14 is depicted in FIG. 6. In said maintenance state, the cover element 56 has been removed. In this case, the lubricant line 42 can be connected to a lubricant supply 64. In the maintenance state, the hydraulic clutch 14 does not have to be provided with hydraulic fluid. The cover element 56 can therefore be removed.

Figure 7:
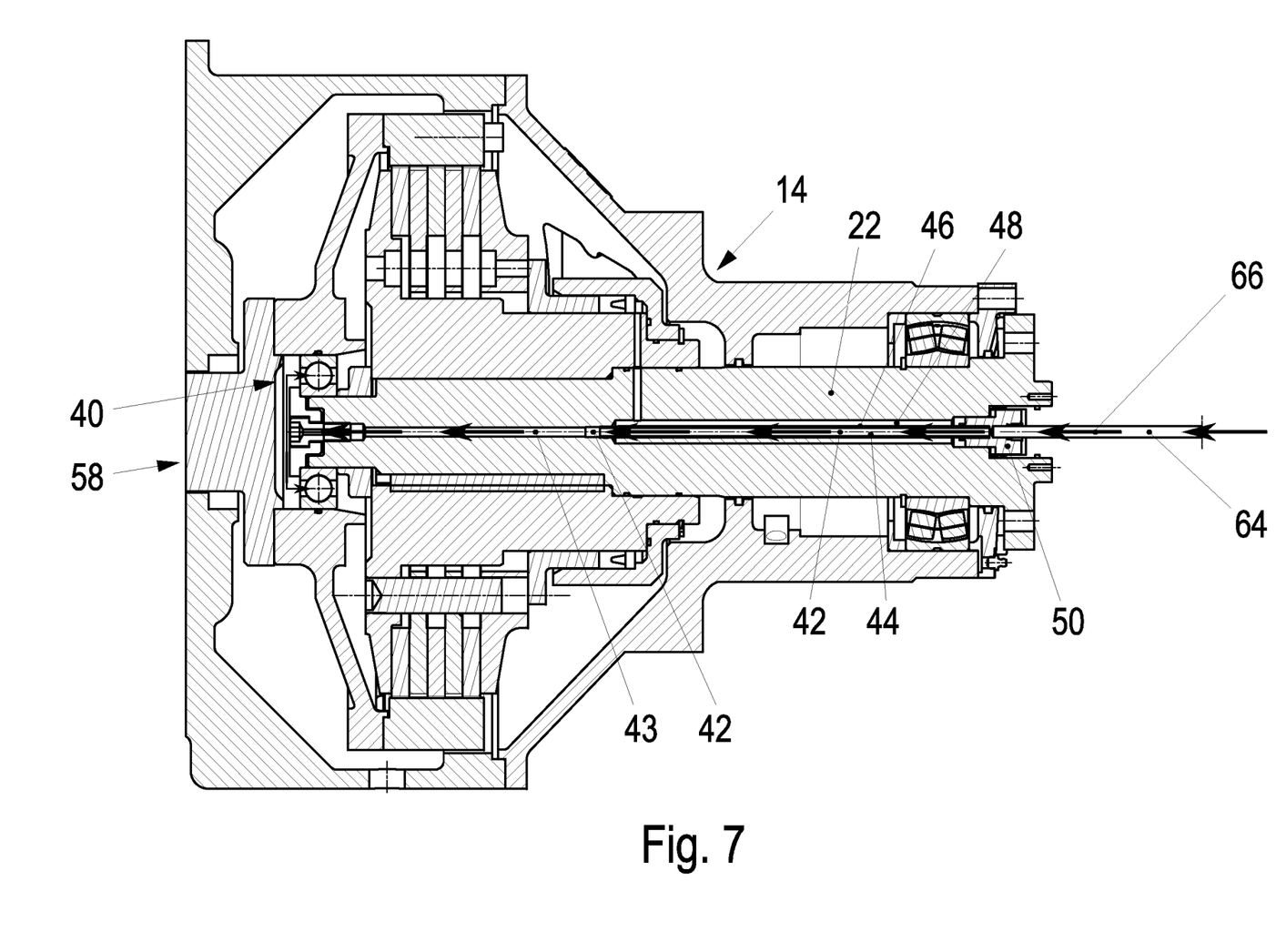
FIG. 7 the clutch during lubrication of the drive-side bearing.

In FIG. 7, the direction of flow of the lubricant is depicted by means of the arrows 66. The lubricant can be conducted to the drive-side bearing 40.

Figure 8:
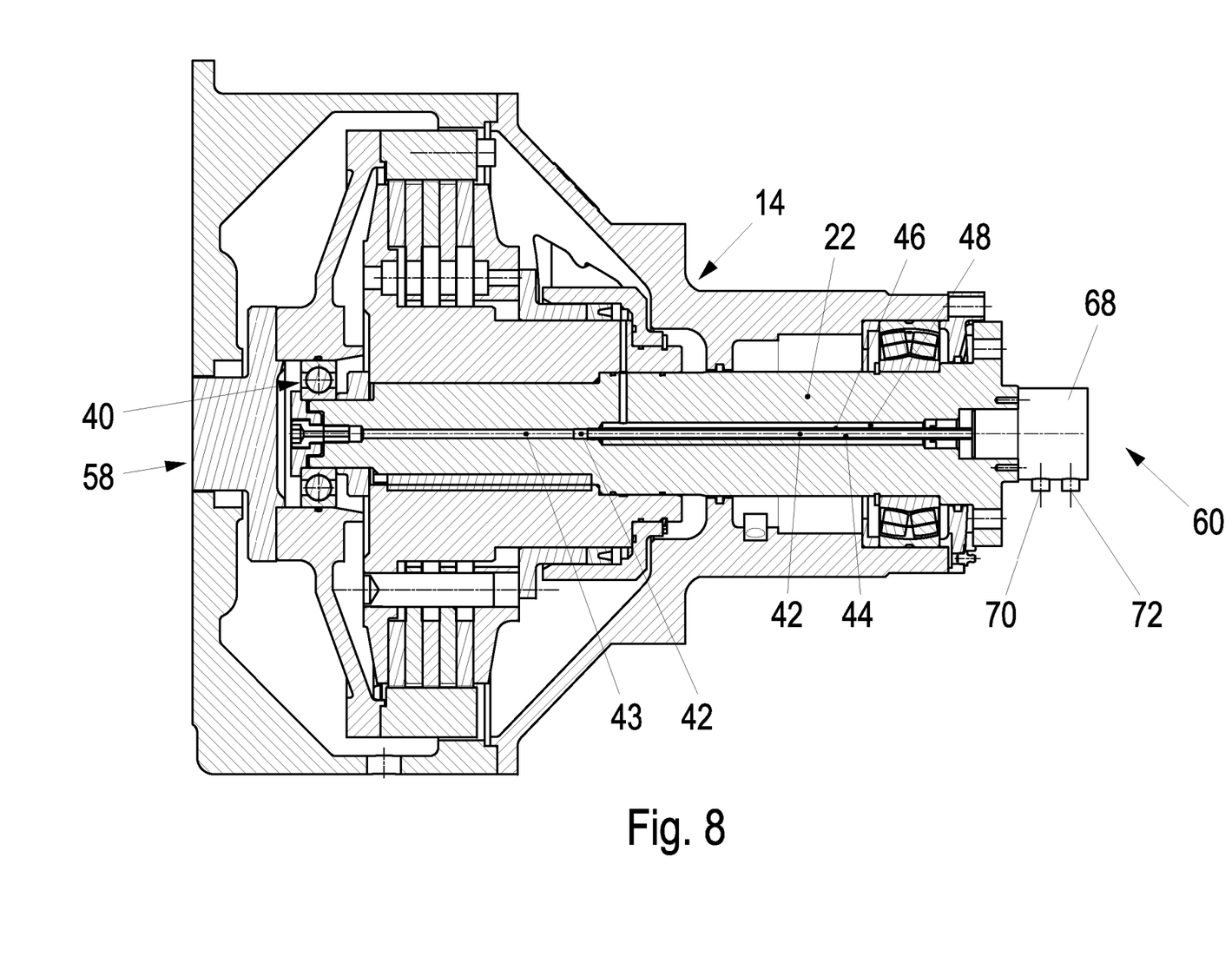

An alternative embodiment is depicted in FIG. 8. It is very similar to the embodiment shown in the previous figures, the difference being, however, that a dual rotary feed-through 68 is arranged in lieu of the cover element 56. Said rotary feed-through 68 comprises, as a minimum, one opening 70 to the lubricant line 42 and, as a minimum, one opening 72 to the hydraulic line 48. The dual rotary feed-through 68 offers the advantage that the drive-side bearing 40 can be lubricated even during operation. It is thus possible to conduct both hydraulic fluid and lubricant through the dual rotary feed-through without the dual rotary feed-through 68 acting as cover having to be removed. Lubrication of the drive-side bearing can thus be effected automatically in accordance with a predetermined time schedule without the operation having to be interrupted.

Figure 9:
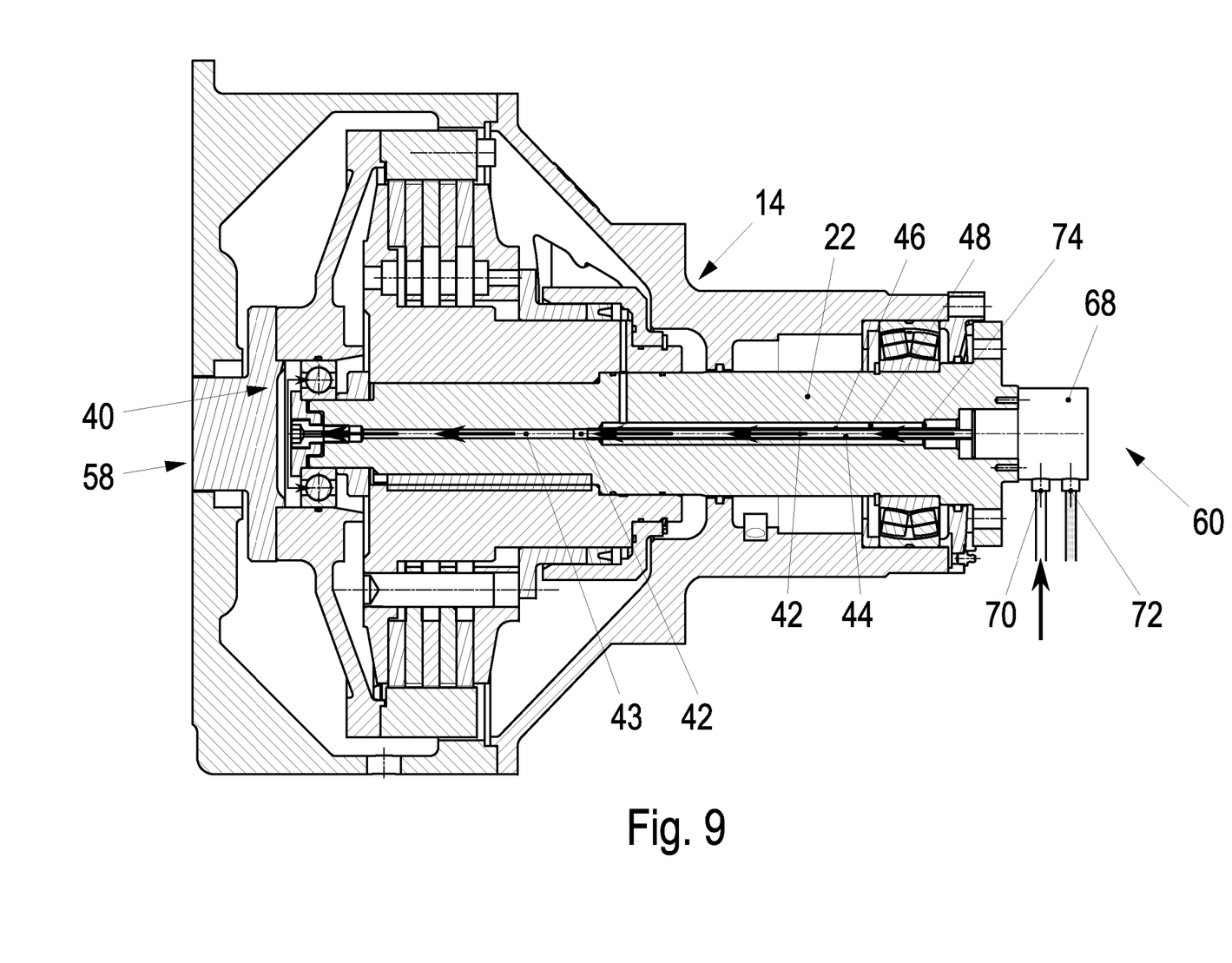
FIG. 9 the clutch according to FIG. 8 with the direction of flow of the lubricant, FIG. 10 the clutch according to FIG. 8 with the direction of flow of the hydraulic fluid.

FIG. 9 shows how the lubricant flows through the dual rotary feed-through to the drive-side bearing. The direction of flow of the lubricant is indicated by means of 74.

Figure 10:
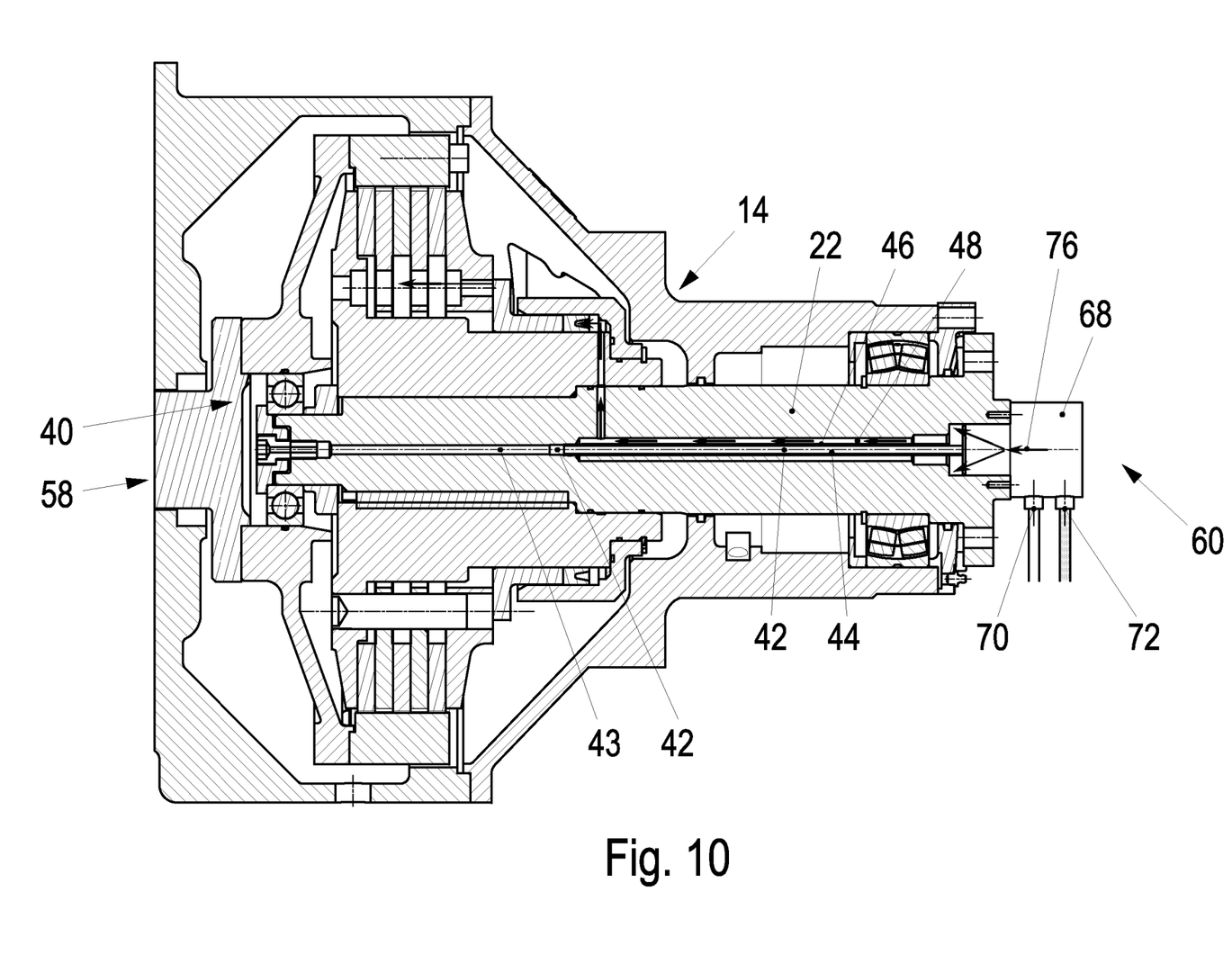

FIG. 10 shows how the hydraulic fluid flows through the dual rotary feed-through 68. The direction of flow of the hydraulic fluid is indicated by means of the arrows 76.

The invention claimed is:

1. A construction machine, comprising:
   a machine frame;
   a plurality of ground engaging units for supporting the machine frame from a ground surface;
   a working drum mounted on the machine frame for working the ground surface;
   a combustion engine;
   a clutch including:
      a first axial end being a drive-side end facing the combustion engine and connected to the combustion engine such that power from the combustion engine is input to the clutch at the drive-side end of the clutch;
      a second axial end opposite from the first axial end and facing away from the combustion engine, the second axial end being a driven-side end, the power from the combustion engine being output from the clutch at the driven-side end of the clutch;
   a driven shaft including a first shaft end facing toward the combustion engine and a second shaft end facing away from the combustion engine;
   a drive-side bearing supporting the first shaft end of the driven shaft adjacent the drive-side end; and
   a lubricant line configured for lubrication of the drive-side bearing, the lubricant line extending from the driven-side end to the drive-side bearing, the lubricant line extending at least partially through the driven shaft; and
   a belt drive connecting the driven shaft and the working drum, the belt drive including a belt pulley mounted on the driven shaft adjacent the second shaft end such that the lubricant line is accessible from outside of the construction machine on an opposite side of the belt pulley from the combustion engine.

2. The construction machine of claim 1, wherein:
   at least part of the lubricant line extending through the driven shaft is located concentrically inside the driven shaft.

3. The construction machine of claim 1, wherein:
   at least part of the lubricant line extending through the driven shaft is located eccentrically inside the driven shaft.

4. The construction machine of claim 1, wherein:
   the clutch is a hydraulic clutch including a hydraulic line configured to switch the clutch, the hydraulic line extending at least partially inside the driven shaft.

5. The construction machine of claim 4, wherein:
   at least part of the hydraulic line extending inside the driven shaft is located concentrically inside the driven shaft.

6. The construction machine of claim 4, wherein:
   the lubricant line extends at least partially inside the hydraulic line.

7. The construction machine of claim 4, wherein:
   the lubricant line extends at least partially concentrically to the hydraulic line.

8. The construction machine of claim 4, further comprising:
   a rod extending inside the hydraulic line; and
   wherein a first section of the lubricant line is defined inside of the rod.

9. The construction machine of claim 8, wherein:
   the rod includes openings for communicating hydraulic fluid to the hydraulic line.

10. The construction machine of claim 1, further comprising:
    a cover configured to close an axial end of the lubricant line adjacent the driven-side end, the cover being configured to be removable in a maintenance state of the clutch so that the lubricant line can be connected to a lubricant supply.

11. The construction machine of claim 10, wherein:
    the clutch is a hydraulic clutch including a hydraulic line configured to switch the clutch; and
    the cover is configured as a rotary feed-through and includes an opening to the hydraulic line so that in an operating state of the clutch the hydraulic line is connected to a hydraulic supply through the cover.

12. The construction machine of claim 1, wherein:
    the clutch is a hydraulic clutch including a hydraulic line configured to switch the clutch; and
    further comprising:
    a dual rotary feed-through configured to close the lubricant line adjacent the driven-side end, the dual rotary feed-through including at least one opening to the lubricant line and at least one opening to the hydraulic line.

13. The construction machine of claim 12, wherein:
    the dual rotary feed-through is configured such that lubrication of the drive-side bearing can be effected automatically in accordance with a predetermined time schedule without interrupting operation of the clutch.

* * * * *